United States Patent [19]

Nelson

[11] Patent Number: 5,639,152

[45] Date of Patent: Jun. 17, 1997

[54] COLLAPSIBLE LCD PROJECTOR

[75] Inventor: Brian Nelson, Birchwood, Minn.

[73] Assignee: Telex Communications, Inc., Minneapolis, Minn.

[21] Appl. No.: 661,631

[22] Filed: Jun. 11, 1996

[51] Int. Cl.[6] .................................................. G03B 21/28
[52] U.S. Cl. ................................... 353/119; 353/99
[58] Field of Search ............................ 353/31, 37, 119, 353/122, 98, 99

[56] References Cited

U.S. PATENT DOCUMENTS

| | | | |
|---|---|---|---|
| 4,157,214 | 6/1979 | Hines | 353/70 |
| 4,351,592 | 9/1982 | Link et al. | 353/72 |
| 4,436,393 | 3/1984 | Vanderwerf | 353/38 |
| 4,588,271 | 5/1986 | Emura | 353/66 |
| 4,640,597 | 2/1987 | Okano et al. | 353/79 |
| 4,810,087 | 3/1989 | Tachibana et al. | 353/79 |
| 4,921,343 | 5/1990 | Ushiro et al. | 353/66 |
| 4,968,134 | 11/1990 | Shimizu et al. | 353/119 |
| 4,969,733 | 11/1990 | Jewison | 353/119 |
| 4,971,436 | 11/1990 | Aoki et al. | 353/31 |
| 5,090,800 | 2/1992 | Ushiro | 353/71 |
| 5,187,510 | 2/1993 | Vogeley et al. | 353/122 |
| 5,287,132 | 2/1994 | Suzuki et al. | 353/119 |
| 5,321,450 | 6/1994 | Shapiro et al. | 353/119 |
| 5,343,262 | 8/1994 | Park | 353/119 |
| 5,347,324 | 9/1994 | Sasaki et al. | 353/119 |
| 5,400,095 | 3/1995 | Minich et al. | 353/119 |
| 5,416,541 | 5/1995 | Fog | 353/119 |
| 5,442,415 | 8/1995 | Chao | 353/119 |
| 5,453,803 | 9/1995 | Shapiro et al. | 353/119 |
| 5,483,382 | 1/1996 | Kappel | 359/786 |
| 5,510,861 | 4/1996 | Minich et al. | 353/119 |

OTHER PUBLICATIONS

*Telex® User's Manual MagnaByte® P170/P170v Desktop LCD Projector;* 32 pages; Telex Communications, Inc., 9600 Aldrich Ave. So., Minneapolis, MN 55420 USA.

*Primary Examiner*—William Dowling
*Attorney, Agent, or Firm*—Gregory P. Kaihoi

[57] ABSTRACT

A portable LCD-type projector for images on a viewing surface such as a projection screen. The projector includes a housing having top, bottom, front and back panels hingedly connected in a parallelogram. The housing panels are movable from a first, generally flat folded position to a second, open position in which the top and bottom panels are generally horizontal and the front and back panels are oriented at a generally 45° angle. The projector includes a light source, a lens, and an LCD or similar image-generating panel. The LCD panel is carried in a location optically between the light source and the lens. The LCD panel is movable from a first, generally horizontal stored position to a second, generally vertical operating position. Mirrors are provided for directing light emitted by the light source through the LCD panel and the lens for projection on a projection screen.

34 Claims, 19 Drawing Sheets

COLLAPSIBLE LCD PROJECTOR

TECHNICAL FIELD

The invention relates to projectors, and in particular to a collapsible projector having a liquid crystal display (LCD) or similar light valve for displaying images on a projection screen.

BACKGROUND OF THE INVENTION

Traditionally, speakers who make audio-visual presentations to groups of people have used one of two common pieces of projection equipment—a slide projector, typically employing 35 mm photographic slides, or an overhead projector, which utilizes overhead transparencies. Each of these types of projectors has advantages and disadvantages. Slides used in slide projectors can be prepared to look very professional, but they require significant advance preparation (which can be both time consuming and expensive), and they typically must be pre-loaded into a slide tray, making it difficult to easily or quickly change the order of the presentation, particularly during the presentation. Overhead transparencies, on the other hand, can be created more easily than photographic slides, and can be rearranged easily just before or even during a presentation. Unlike a slides in a slide projector, however, overhead transparencies cannot be remotely changed by the speaker. Rather, the speaker (or an assistant) must physically place each transparency in the proper position on the projector. This process often is distracting to both the speaker and the audience, and the distraction can be exacerbated by improper alignment of the transparency on the projector, a very common difficulty. Also, without a careful organizational system, transparencies can easily get out of order from one presentation to the next.

Advances in personal computing and desktop publishing have enabled even the average computer user to easily and economically produce professional quality reports, charts, graphs, and other visual aids. Use of such visual aids in presentations, however, requires conversion of the computer generated image to some other medium, such as a slide or transparency, that is capable of being projected by conventional projection equipment. Though it is possible to create overhead transparencies even in color, the process is not always convenient or inexpensive.

Color video projectors have become available in recent years. Such projectors have most commonly been used as large screen TV projectors, and currently are popular both in "home theaters" (i.e., large screen systems installed in one's home) and in conference room settings for the display of video tapes. With the proper interfaces, it is possible to display the video signal from a computer on a large screen TV through such color video projectors. Such projectors are both expensive and bulky, however, and, therefore, are often mounted in a relatively permanent installation. As such, they are not typically suitable for portable use in the way that an overhead or slide projector may be used.

Advancements in LCD panel technology have opened new avenues for projection techniques. In particular, several companies (including the assignee of the present application) have introduced computer-driven LCD panels which can be placed on a conventional overhead projector. The LCD panel displays the video output of the computer, which is then projected on a screen. Since laptop computers typically use an LCD panel as the computer monitor, some companies have even introduced laptops which allow the LCD panel to function both as a traditional screen and as an overhead projection panel which can be placed on an overhead projector, as described above. Such LCD panels, though portable, nevertheless require the use of separate, conventional overhead projectors (which typically are themselves somewhat bulky). A presenter must therefore nevertheless rely on the availability of an overhead projector at the site of the presentation (or else carry not only the notebook computer containing the presentation graphics but also the portable LCD panel and a "portable" overhead projector.

To solve this inconvenience, some "desktop" projectors have been manufactured with built-in LCD panels, alleviating the need for a separate overhead projector. Such desktop projectors, however, are nevertheless relatively bulky and would not be considered to be truly "portable". For example, one such projector sold by the assignee of the present application under the model name "P170" is about 6.75" tall with a footprint of 12"×15", weighing 12.3 lbs. Though smaller than many overhead projectors, it is significantly larger than, e.g., a notebook computer. In particular, in order to house an LCD panel of suitable size, this projector is of necessity more than twice as tall (i.e., thick) as a typical notebook computer. Accordingly, such projectors are not as easily or conveniently transported as are, e.g., notebook computers.

SUMMARY OF THE INVENTION

The invention provides a truly portable, collapsible projector for projecting computer generated images (or other video images) on a screen. The projector can be connected to the standard monitor port on a computer, or it can be driven by other video sources. The projector includes a housing having top, bottom, front and back panels hingedly connected in a parallelogram. The housing panels are movable from a first, folded position to a second, open position in which the top and bottom panels are generally horizontal and the front and back panels are oriented at a generally 45° angle.

The projector also includes a light source, a lens, and an LCD panel (or equivalent image generating light valve). The LCD panel is carried in a location optically between the light source and the lens. The LCD panel is movable from a first, generally horizontal stored position to a second, generally vertical operating position. One or more mirrors (preferably three) are provided for directing light emitted by the light source through the LCD panel and the lens for projection on a viewing surface such as a projection screen.

At a folded size of about 3 inches thick with a footprint of about 10.3×16 inches, and a weight of less than 10 lbs., a preferred embodiment of the projector is close in size to a notebook computer, and is easily transported. Thus, by bringing simply a notebook computer and a portable projector of the invention, a presenter may easily make high quality presentations without needing to rely on the availability of any presentation equipment at the site of the presentation.

DETAILED DESCRIPTION OF THE INVENTION

Figure 1:
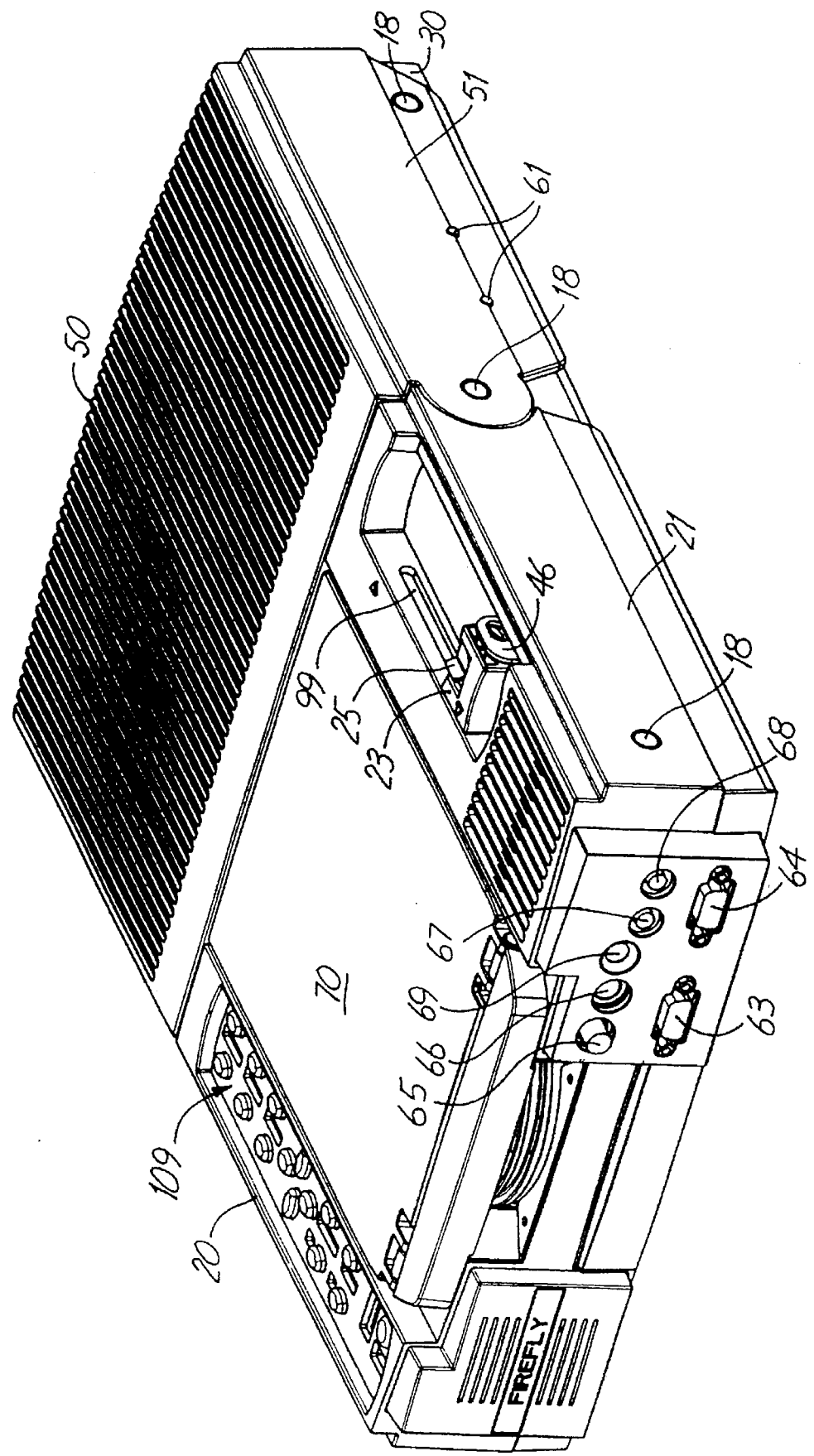
FIG. 1 is a front, top, right side perspective view of a collapsible projector of the invention in its folded position.

The drawings described briefly above depict, in various views and positions, a preferred embodiment of the projector of the invention. It will be understood, however, that many of the specific details of the projector illustrated in the drawings could be changed, modified or even eliminated in some cases by one of ordinary skill in the art without departing significantly from the spirit of the invention.

FIG. 1 shows the preferred embodiment of the projector of the invention in the folded position. In this position, the unit is quite compact in size, being only about 3 inches thick, about 10.3 inches wide, and about 16 inches long, weighing slightly less than 10 pounds. As such, the projector is close in size to a notebook computer, and is easily stored and transported by the user to the site of the presentation. When opened for use, the projector assumes the parallelogram configuration depicted in FIGS. 2–4.

The projector housing is constructed from four basic panels which make up the basic parallelogram configuration—top and bottom panels 20 and 30, and front and back panels 40 and 50, respectively. These panels are pivotally attached to one another by suitable pivot pins 18. As can be seen from FIG. 1, in the folded configuration the back panel 50 folds to a position essentially parallel to the position of the top panel 20, so that, in this position, the back panel actually functions as a part of the top of the projector housing. Similarly, in the folded configuration the front panel 40 functions as part of the bottom of the projector housing.

To facilitate a good light seal (i.e., preventing excessive stray light from escaping from the housing) the panels all include generally vertically extending left and right flanges—the flanges 21 and 51 of the top and back panels, respectively, extend generally downwardly from the left and right sides, and the flanges 31 and 41 of the bottom and front panels, respectively, extend generally upwardly from the left and right sides of the panels. The upwardly extending flanges 31 and 41 of the bottom and front panels nest essentially entirely within the downwardly extending flanges 21 and 51 of the top and back panels when the housing is in its first, folded position.

In the preferred projector depicted in the drawings, the parallelogram housing opens to a height taller than twice its folded height. Consequently, slats 60 are provided to complete the light seal on the left and right sides of the housing (see FIGS. 2–4). Each slat 60 is pivotally attached at its front end to the front panel 40 of the housing by a suitable pivot pin 61 and at its rear end to the back panel 50 of the housing by a similar pivot pin 61, the slats 60 thereby forming side panels of the projector when the housing is in its open position. The slats nest within the downwardly extending flanges of the top and back panels 20 and 50 when the housing is in its first, folded position. In the drawings the projector is depicted as utilizing two slats 60 to complete the side panels of the projector—the number of such slats required will depend on the height of the top and bottom panel flanges 21 and 31, as well as the relative height of the projector in its folded and unfolded positions.

Figure 2:
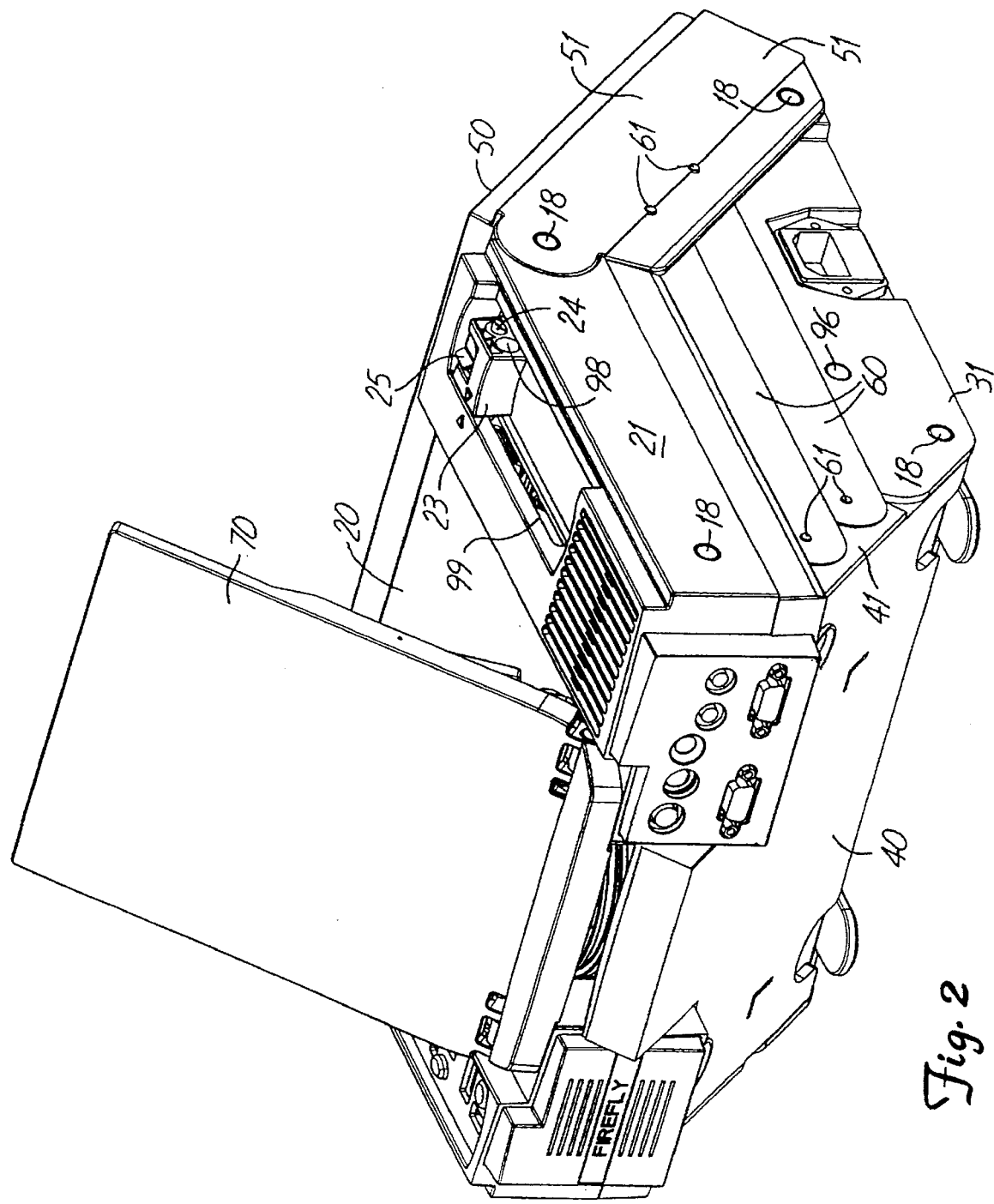
FIG. 2 is a front, top, right side perspective view of the collapsible projector of FIG. 1 in its unfolded position but with the top, adjustable projection mirror only partially deployed.
Figure 3:
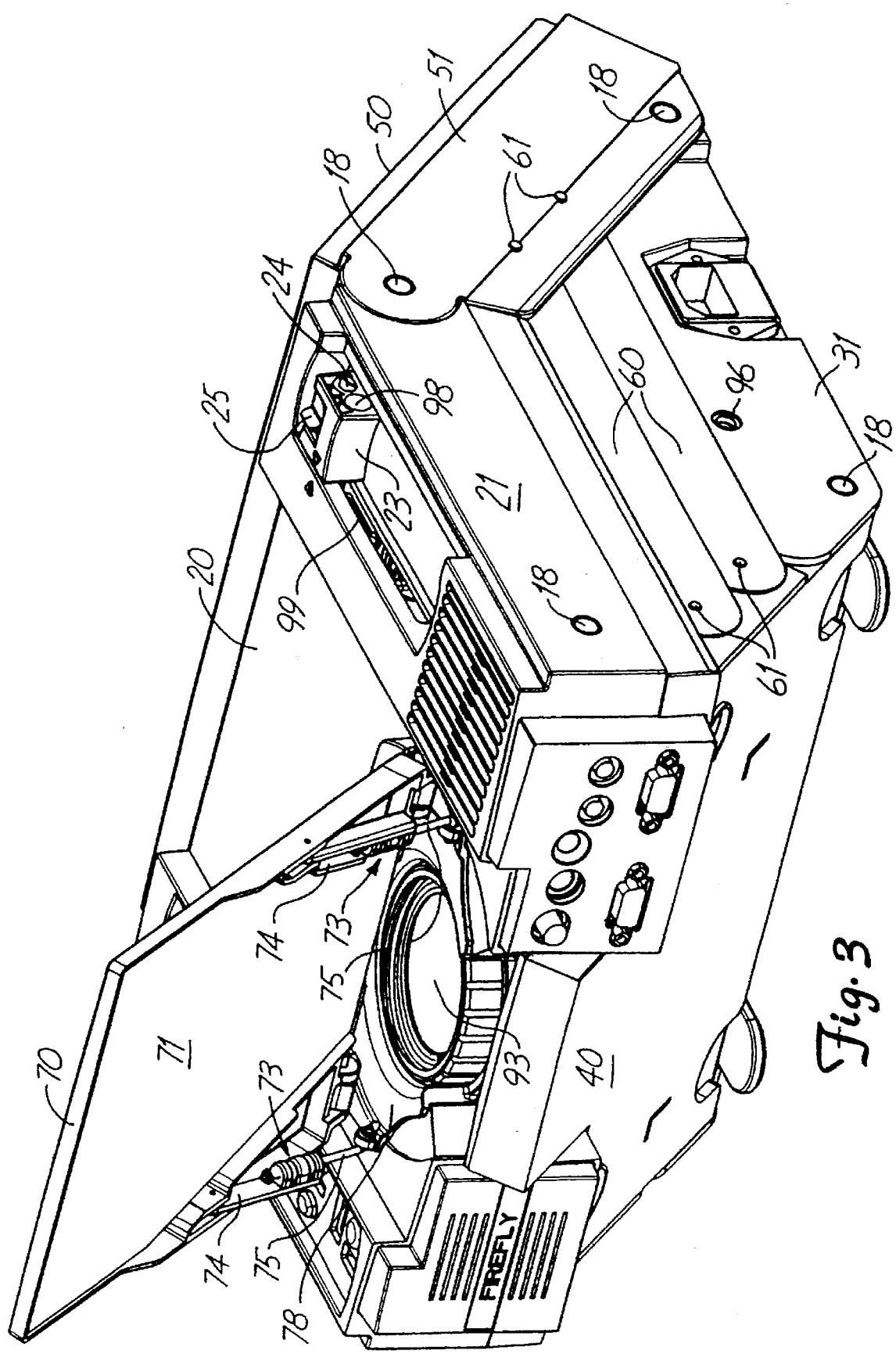
FIG. 3 is a front, top, right side perspective view of the collapsible projector of FIG. 1 in its unfolded position and with the top, adjustable projection mirror fully deployed in its operative position.
Figure 4:
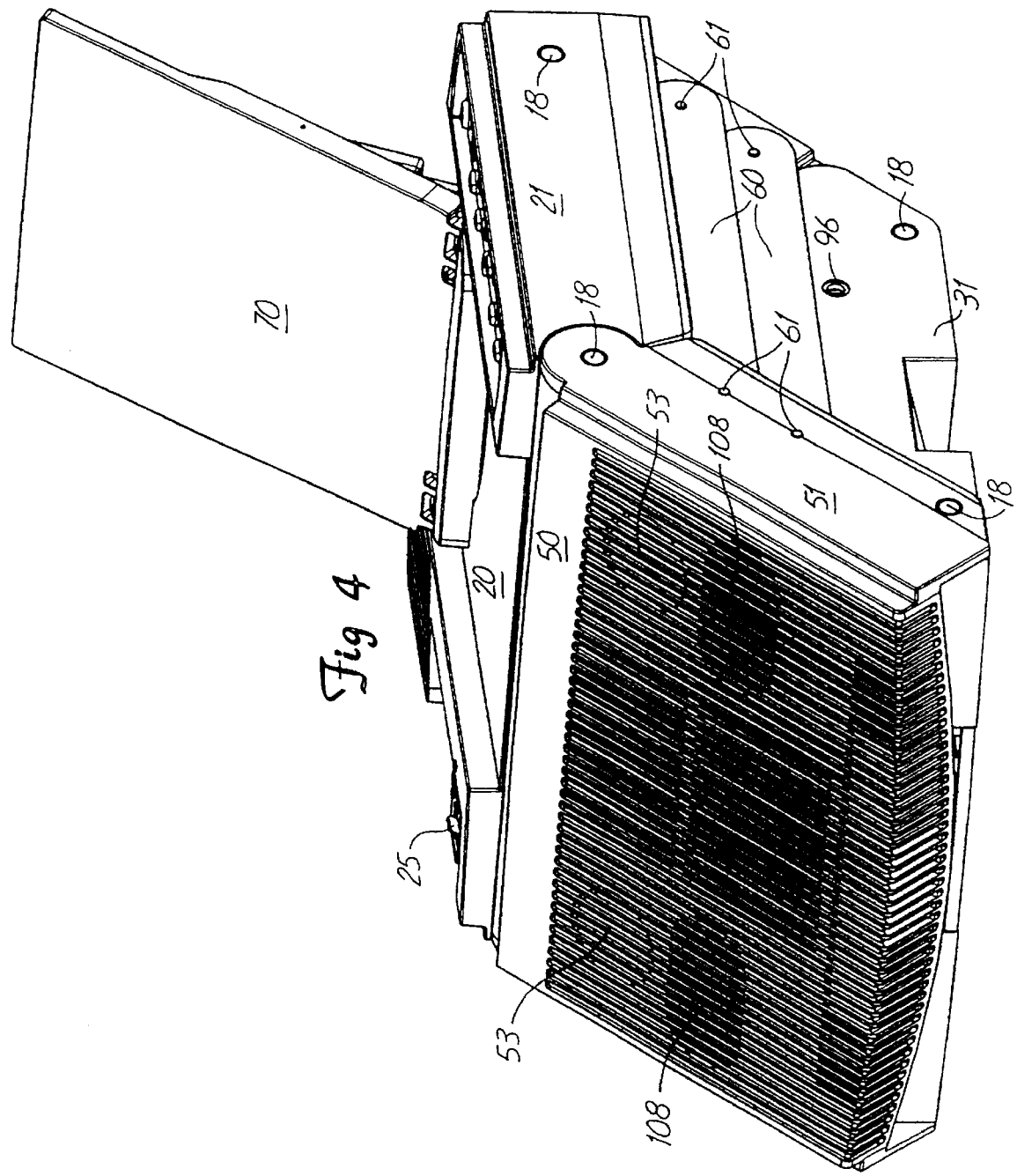
FIG. 4 is a rear, left side perspective view of the collapsible projector of FIG. 1 in its unfolded position and with the top, adjustable projection mirror fully deployed in its operative position.
Figure 5:
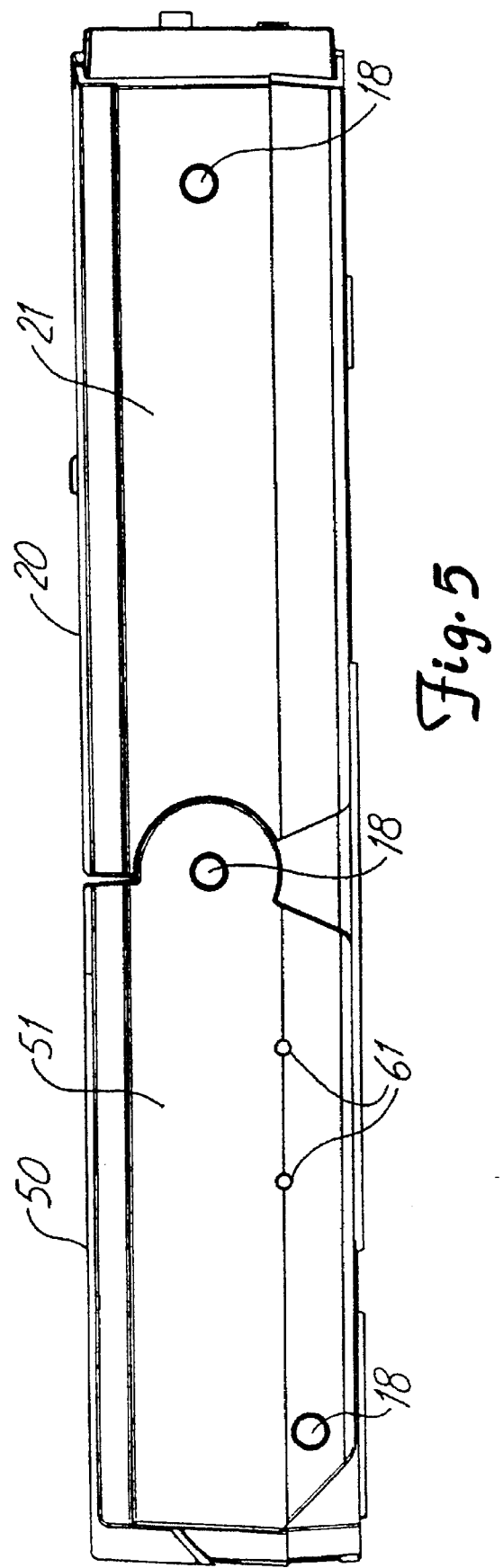
FIG. 5 is a left side elevational view of the collapsible projector of FIG. 1 in its folded position.
Figure 6:
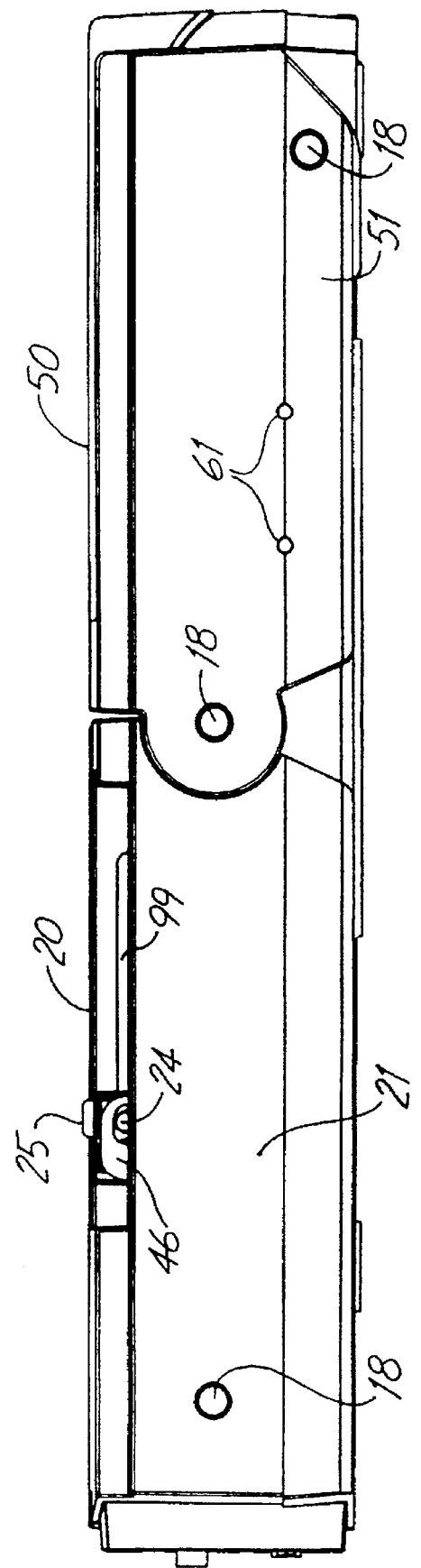
FIG. 6 is a right side elevational view of the collapsible projector of FIG. 1 in its folded position.
Figure 7:
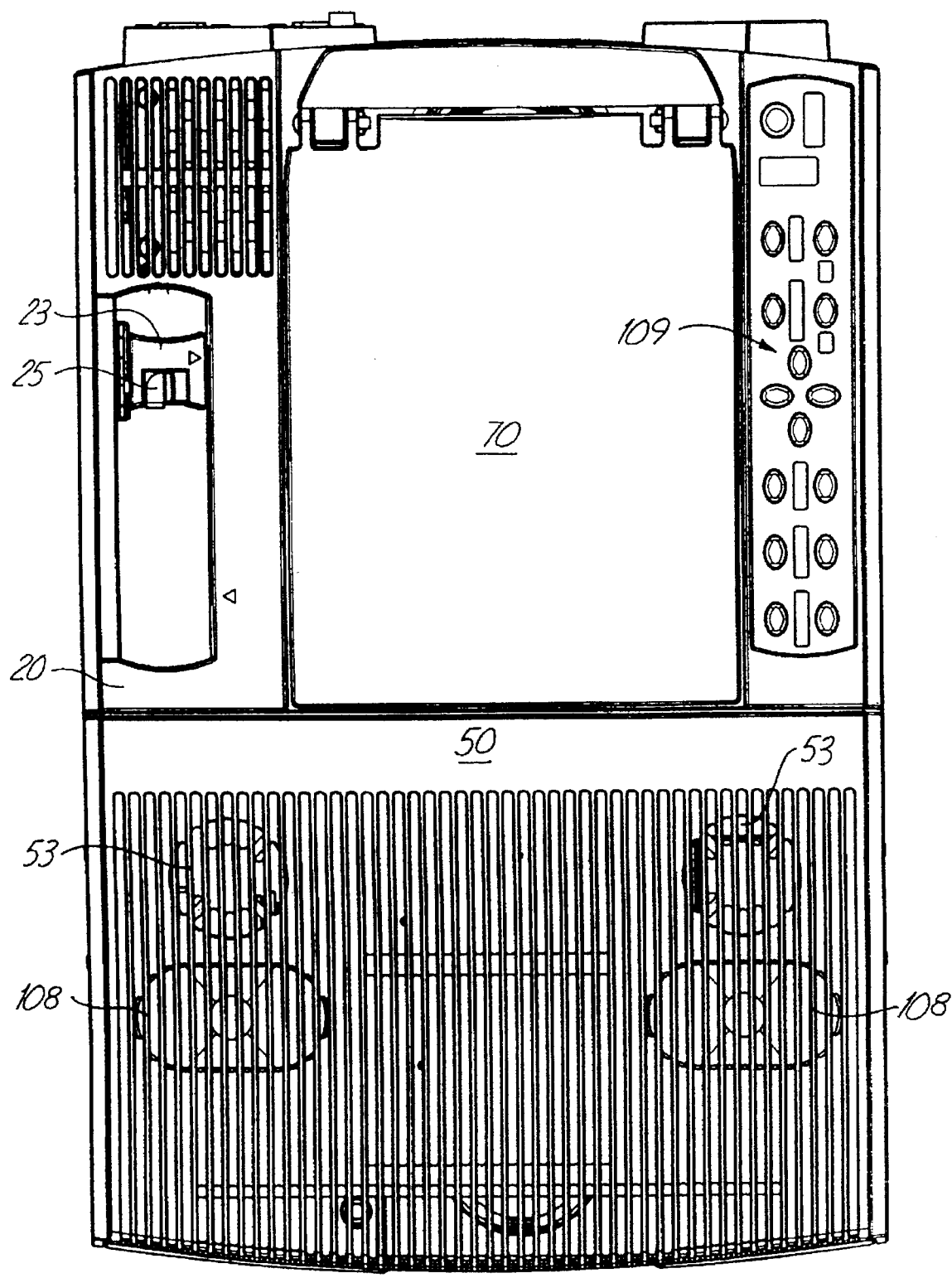
FIG. 7 is a top plan view of the collapsible projector of FIG. 1 in its folded position.
Figure 8:
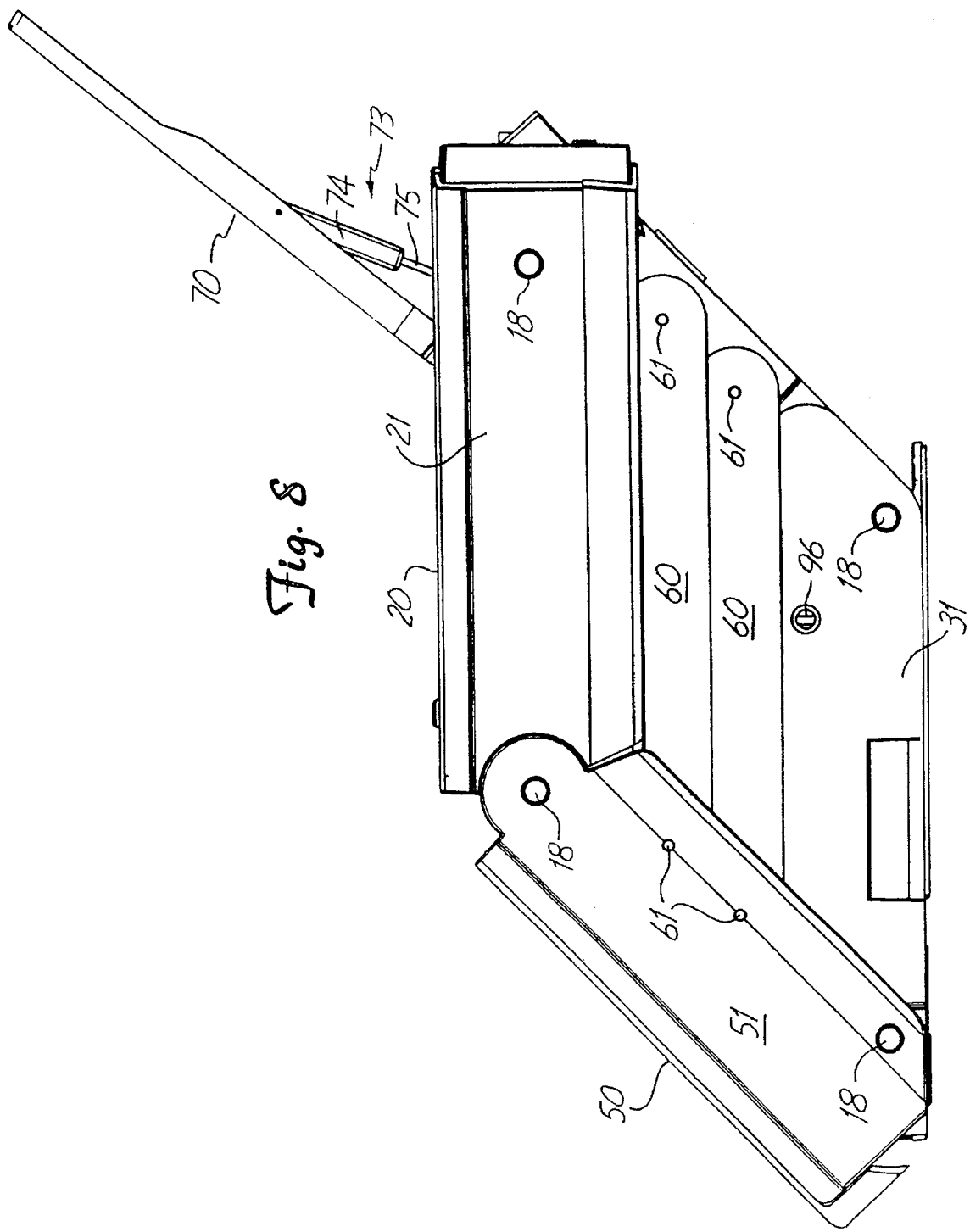
FIG. 8 is a left side view of the collapsible projector of FIG. 1 in its unfolded position and with the top, adjustable projection mirror fully deployed in its operative position.
Figure 9:
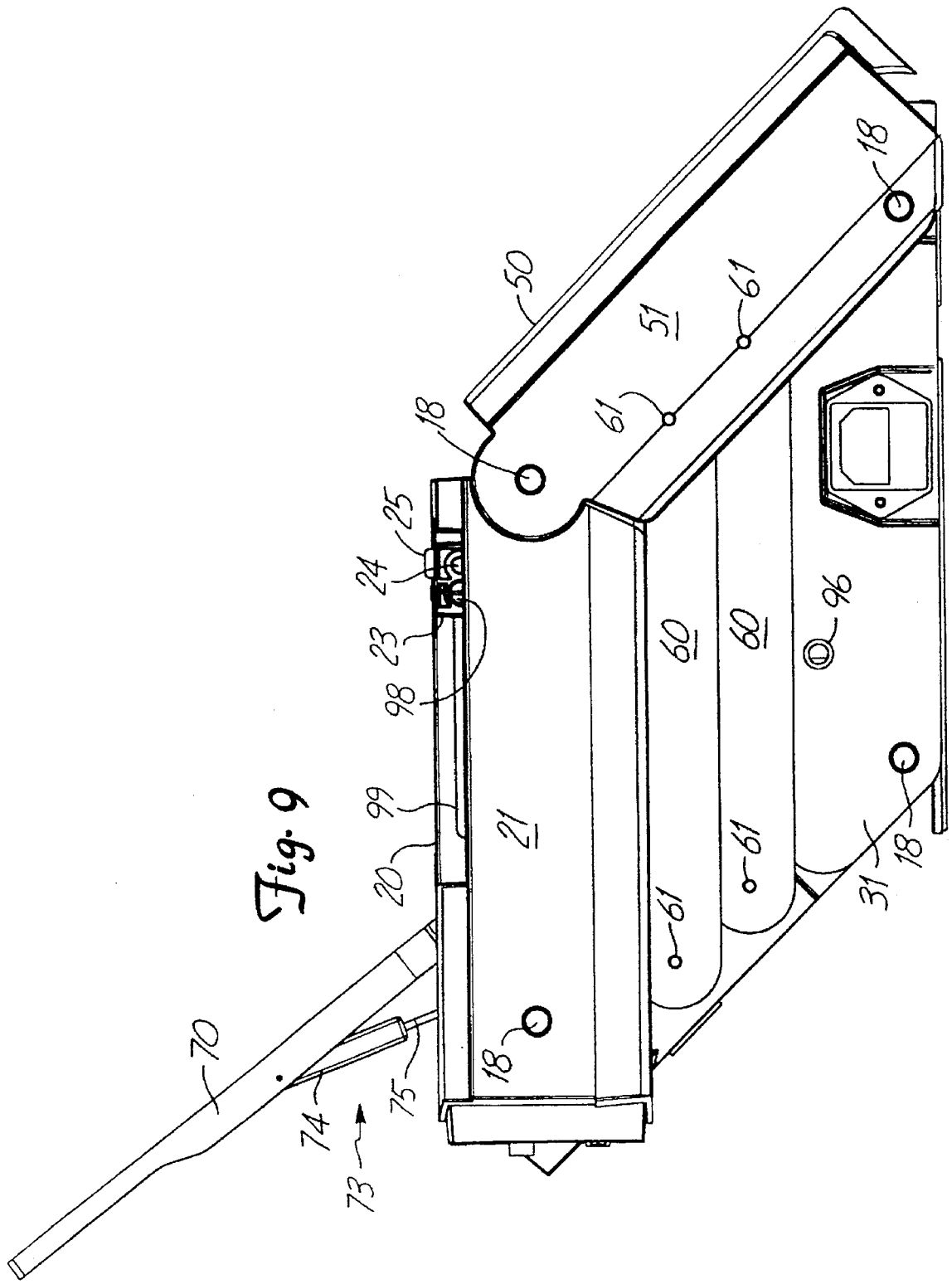
FIG. 9 is a right side view of the collapsible projector of FIG. 1 in its unfolded position and with the top, adjustable projection mirror fully deployed in its operative position.
Figure 10:
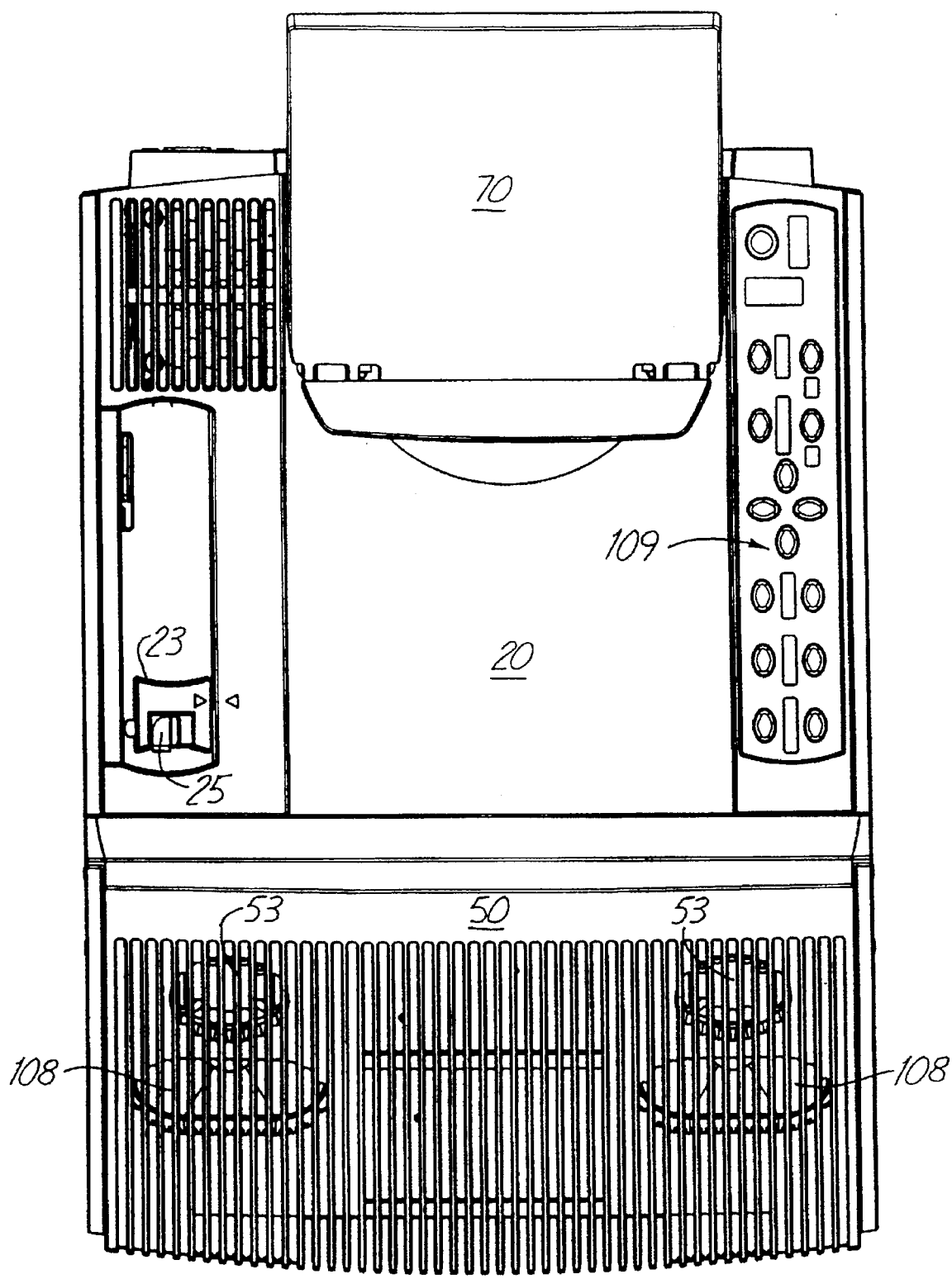
FIG. 10 is a top plan view of the collapsible projector of FIG. 1 in its unfolded position and with the top, adjustable projection mirror fully deployed in its operative position.
Figure 11:
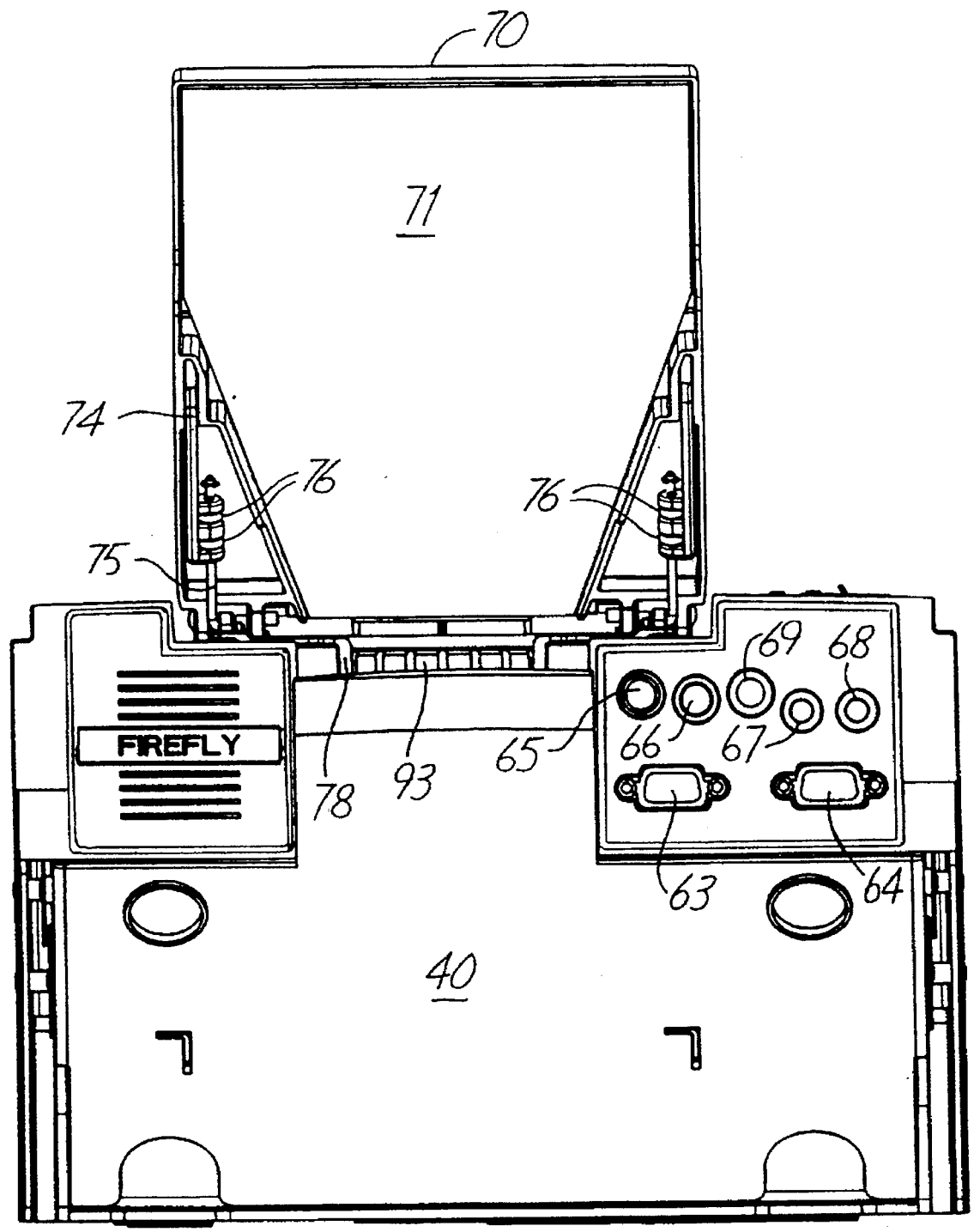
FIG. 11 is a front elevational view of the collapsible projector of FIG. 1 in its unfolded position and with the top, adjustable projection mirror fully deployed in its operative position.

As is described below in connection with a more detailed description of the optical system of the projector, the unit includes an externally extending mirror 71 as the optical component which reflects the projection image on a viewing surface (typically a projection screen or a blank wall). The mirror 71 is mounted to a protective mirror frame 70 which can be manipulated (as is shown in FIGS. 2 and 3) from a first, closed position, where the mirror 71 and mirror frame 70 are oriented generally parallel to the housing top panel 20, to a second, operative position where the mirror 71 and mirror frame 70 are oriented at an acute angle extending upwardly from the housing top panel 20, thereby reflecting the image toward the viewing surface. In FIG. 2, the mirror frame 70 has been elevated from its closed, generally horizontal position to its open, angled position. The frame is then rotated to the position shown in FIG. 3 for use in projection of the image. Thus, the mirror 71, in its operative position, has an upper, forward edge and a lower, rear edge. In its stored position, the mirror's upper, forward edge is located rearwardly of the lower, rear edge.

FIGS. 4–11 illustrate the external appearance of the projector from various angles, depicting the relative position of the various housing components with respect to one another in the folded and unfolded positions.

Figure 12:
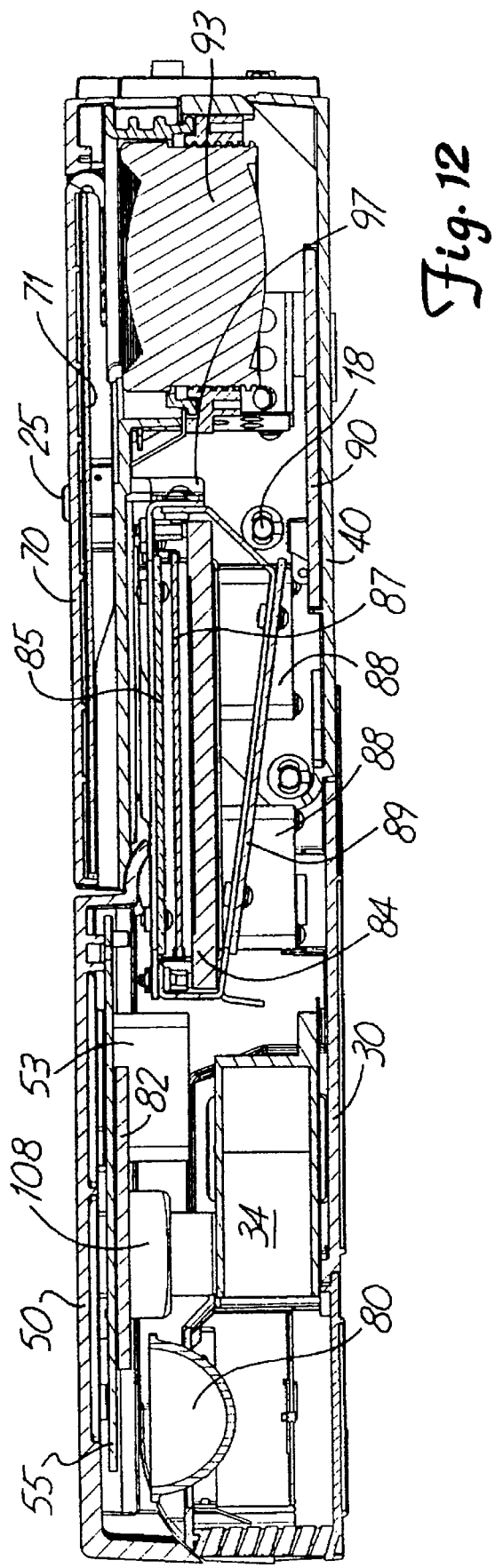
FIG. 12 is a cross-sectional view of FIG. 7, taken along lines 12—12 thereof, depicting the projector in its folded position.
Figure 13:
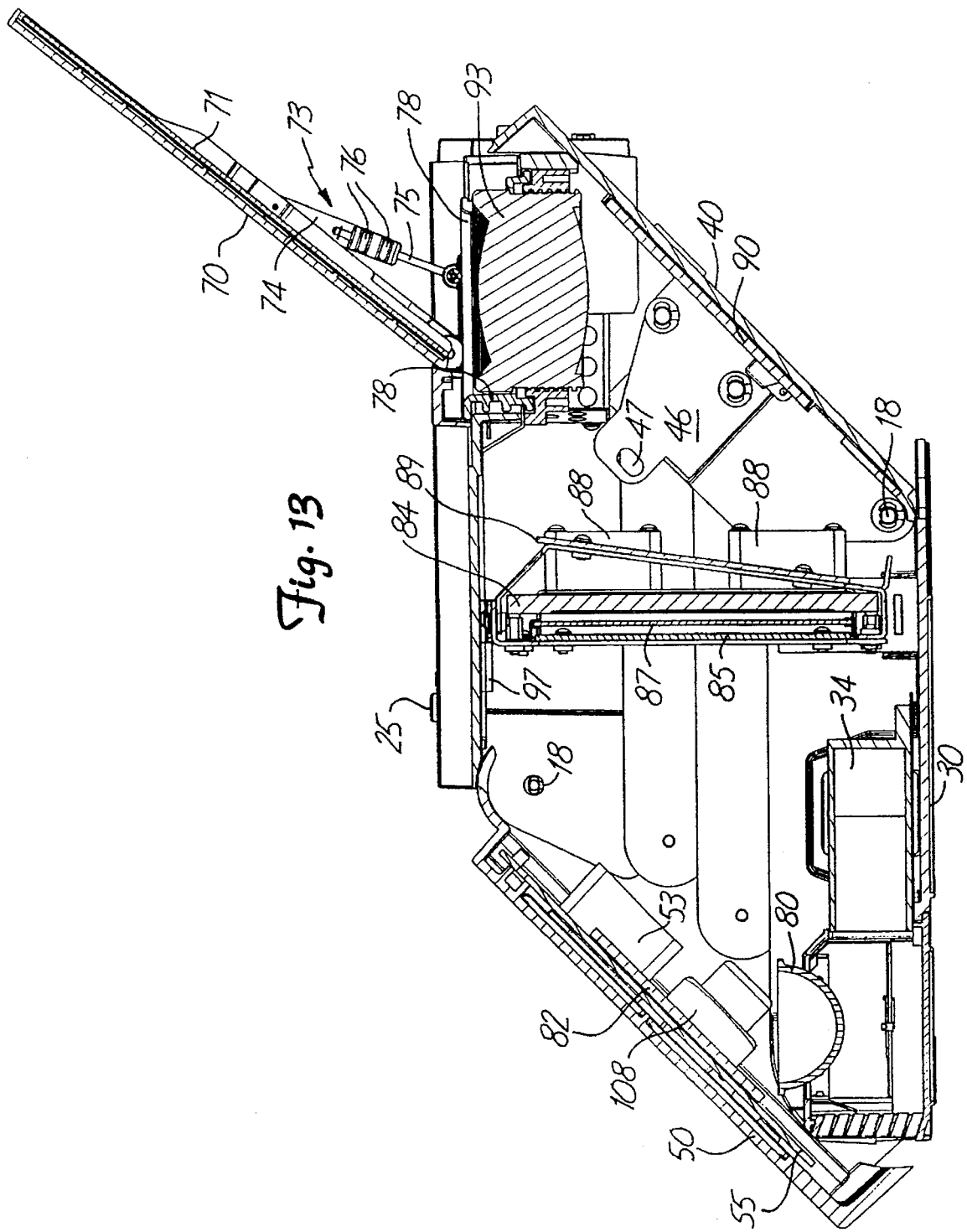
FIG. 13 is a cross-sectional view of FIG. 10, taken along lines 13—13 thereof, depicting the projector in its unfolded position.
Figure 14:
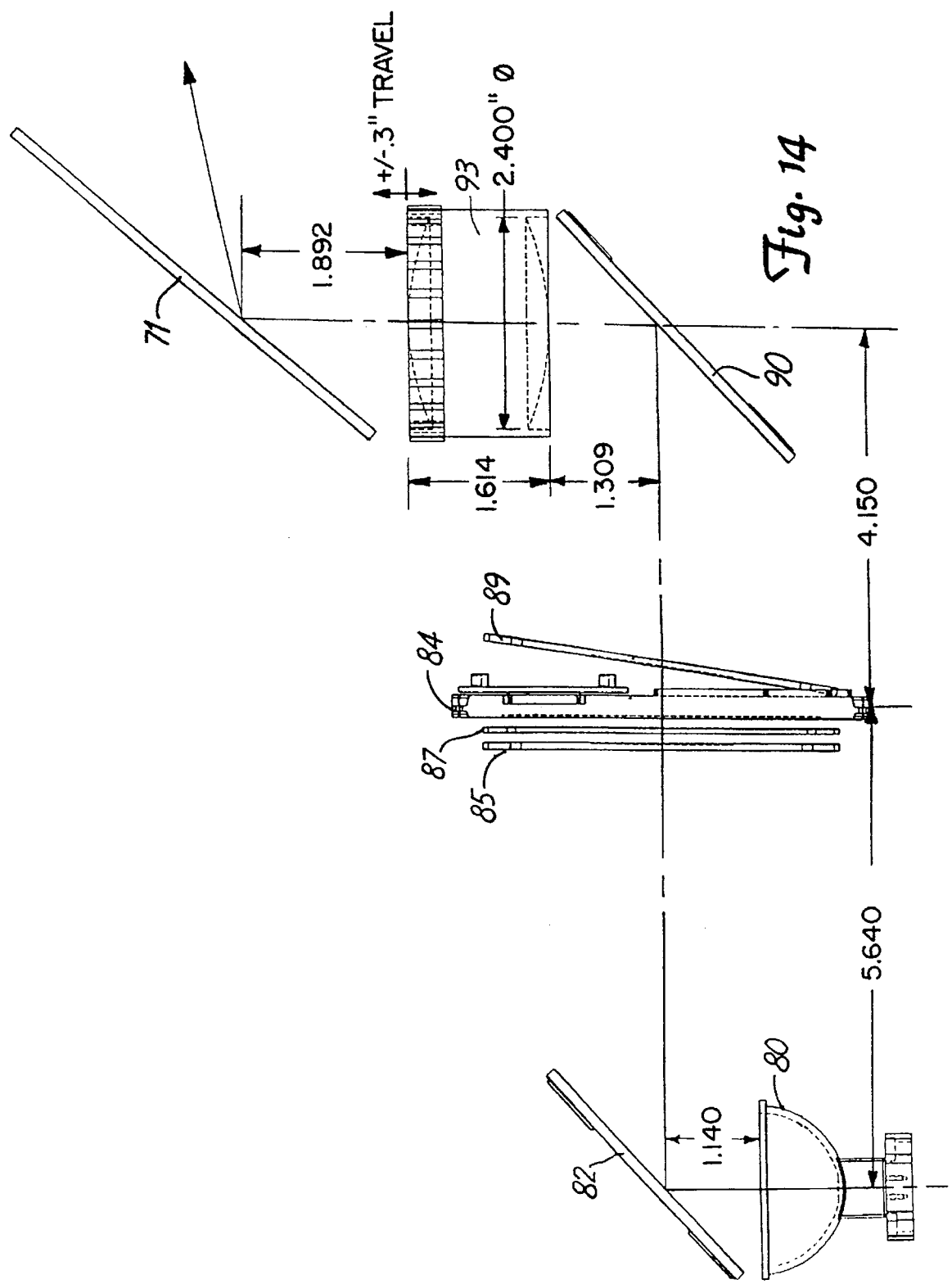
FIG. 14 is a somewhat schematic diagram depicting a light path and the optical components of the projector of FIG. 1.

FIGS. 12–13 show the relative positions of the various internal components of the projector, including the optical components, in both the folded and unfolded positions, and FIG. 14 illustrates in somewhat schematic fashion the light path through the various optical components. A projection lamp 80 is positioned near the back of the projector, and projects a beam of light upwardly. The light beam is reflected off of a first mirror 82 which is carried by the back panel 50. Preferably both the back panel 50 and the first mirror 82 are oriented at a generally 45° angle when the projector is in its open, operative position, and both such elements are oriented generally horizontally when the projector is in its closed position.

After being reflected by the first mirror, the light travels generally horizontally through the image forming panel, which preferably is an LCD panel 84. Any of a variety of optical "light valves" could be utilized in lieu of the LCD panel, but, as discussed above, current projection technology widely utilizes LCD panels as the preferred medium of choice for generating the optical image to be projected. To the extent the LCD panels are replaced in the future with other image forming technologies, they could also be utilized in the projector of the invention.

With current LCD panels, it is highly desirable that light entering the panel have a 90° angle of incidence. This can be accomplished conveniently with a suitable fresnel lens 85. Polarizing lenses are also employed on both sides of the LCD panel for best LCD panel performance; the lamp-side polarizing lens 87 preferably is spaced slightly away from the LCD panel 84 and the lamp-side fresnel lens 85 to permit cooling air circulation between these elements. The lensside (i.e., referring to the side of the LCD panel on which the focusing lens 93 is located) polarizing lens absorbs significantly less light than the lamp-side polarizing lens 87, and accordingly does not necessarily need to be spaced from LCD panel; in the drawings, the lensside polarizing lens is not separately shown as it is carried integrally in the LCD panel 84.

A second fresnel lens 89 on the focusing lens side of the LCD panel 84 may be employed to provide keystone correction. The keystone correcting fresnel lens 89 is mounted at an angle to the LCD panel 84, and optically modifies the light rays coming through the LCD panel 84 to optically compensate for the keystone effect which occurs when an image is projected on a flat surface at an upward angle (such as from a desktop onto a wall). The keystone correcting fresnel lens 89 can be mounted in the projector so that it is adjustable to different angles (relative to the LCD panel) to provide precise keystone correction at different projection angles. In the preferred projector depicted in the drawings, however, the keystone correcting fresnel lens 89 simply is set at the angle which provides at least partial keystone correction for the average projection angle. This angle may differ from one projector to the next, depending upon the primary intended uses of the projector.

After passing through the keystone correcting fresnel lens 89, the light is then reflected by a second mirror 90. This mirror 90 preferably is set at a generally 45 ° angle, being carried by the front panel 40 of the projector housing. The front panel 40 itself preferably is also oriented generally at a 45 ° angle when the projector is in its open, operative position. Light reflected by the second mirror 90 then travels generally upwardly, passing through focusing lens 93, and is then reflected by the third, external mirror 71 onto the projection surface (such as a screen or a wall).

As is described above, the third mirror 71 is carried by a movable frame 70. Not only is the frame movable from a first, closed position to a second, operative position, but the actual angle of the frame 70 and mirror 71 with respect to the projector housing is adjustable in the open position to permit adjustment of the height at which the image is projected on the viewing surface. That is, instead of propping up the front end of the projector to raise the image on the viewing surface, the operator may merely adjust the angle of the mirror 71 and mirror frame 70.

Adjustability of the mirror 71 angle may be provided in any suitable fashion. In the preferred embodiment depicted in the drawings, rotation of the mirror frame 70 from its stored position to its operative position is provided by mounting the mirror frame 70 to a rotatable collar 78, which in turn is carried by the top panel 20 of the projector. Elevation of the mirror frame is provided by pivotally connecting the lower, rear edge of the mirror frame 70 to the rotatable collar 78 housing top panel 20, and providing a pair of telescoping struts 73 to support the mirror frame 70 in the desired upwardly angled position. These struts 73 may be of any suitable construction. In the preferred embodiment of the drawings each strut 73 includes two sections—a pivotable arm 74 attached at one end (the upper end in FIG. 13) to the mirror frame 70, and a pivotable rod 75 secured at one end (the lower end in FIG. 13) to the rotatable collar 78. The upper end of the rod 75 is closely received in the lower end of the pivotable arm 74; a pair of O-rings 76 having an inner diameter slightly less than the outer diameter of the rod 75 are carried by the lower end of the arm 74 to provide sufficient friction to hold the mirror frame 70 in its desired position, while permitting easy adjustment of the angle of the mirror frame 70 with respect to the projector housing.

The overall size of LCD panel-type projectors is dictated in significant measure by the size of the LCD panel utilized. Larger LCD panels proportionately increase the size of the projector housing within which the LCD panel (and its associated light path) must be contained. The folded optical path of the projector of the invention reduces the external size of the housing (i.e., in comparison to the size of a projector using a straight, non-folded optical path) when the projector is in its open, operative position. The ability of the projector to be folded to a substantially smaller size for storage and portability, however, requires the components of the optical light path to fold to a suitably compact size.

As described above, the externally extending mirror 71 can be folded flat against the top panel 20 of the housing. The other two internally mounted mirrors 82 and 90 are carried by the back and front panels 50 and 40, respectively, and, hence, they move with those panels when the projector is opened and closed. Because of their size and orientation within the light path and the projector, both the lamp 80 and the focusing lens 93 can be securely mounted respectively to the bottom and top panels 30 and 20—when the projector is opened and closed, the lamp (and the bottom panel 30) does not move, and the focusing lens 93 merely moves up and down as the top panel 20 moves up and down.

Figure 16:
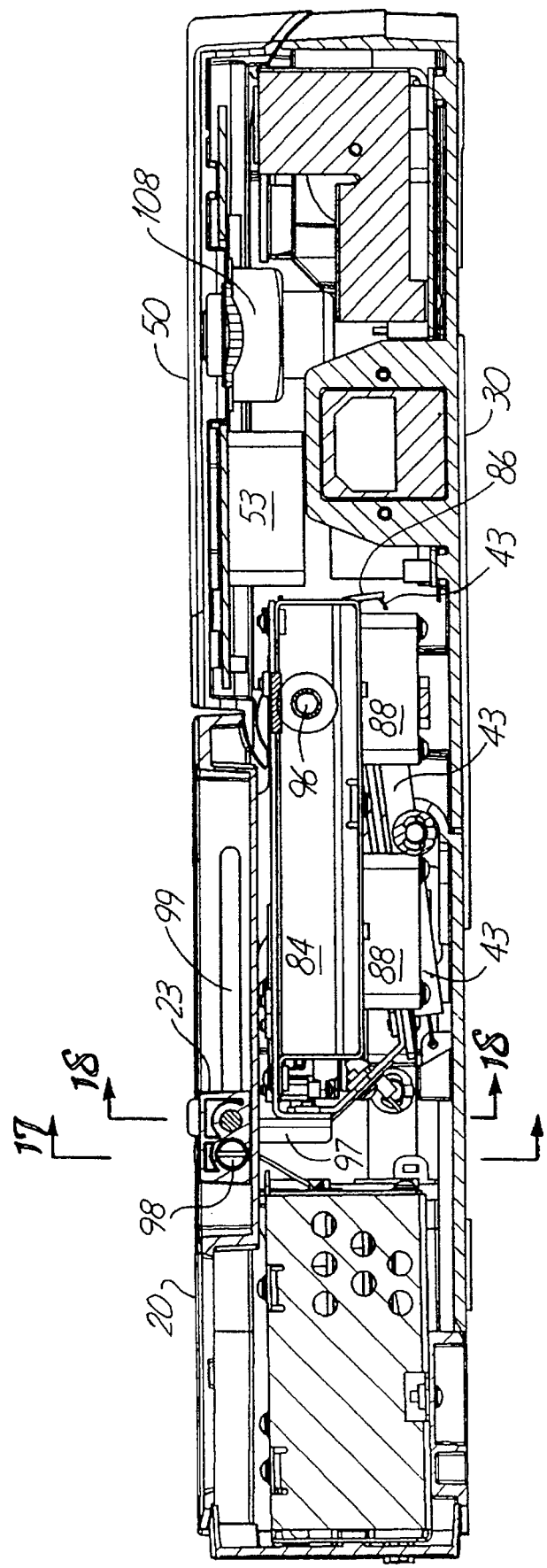
FIG. 16 is a cross-sectional view similar to FIG. 15 but depicting the projector in its folded position.
Figure 17:
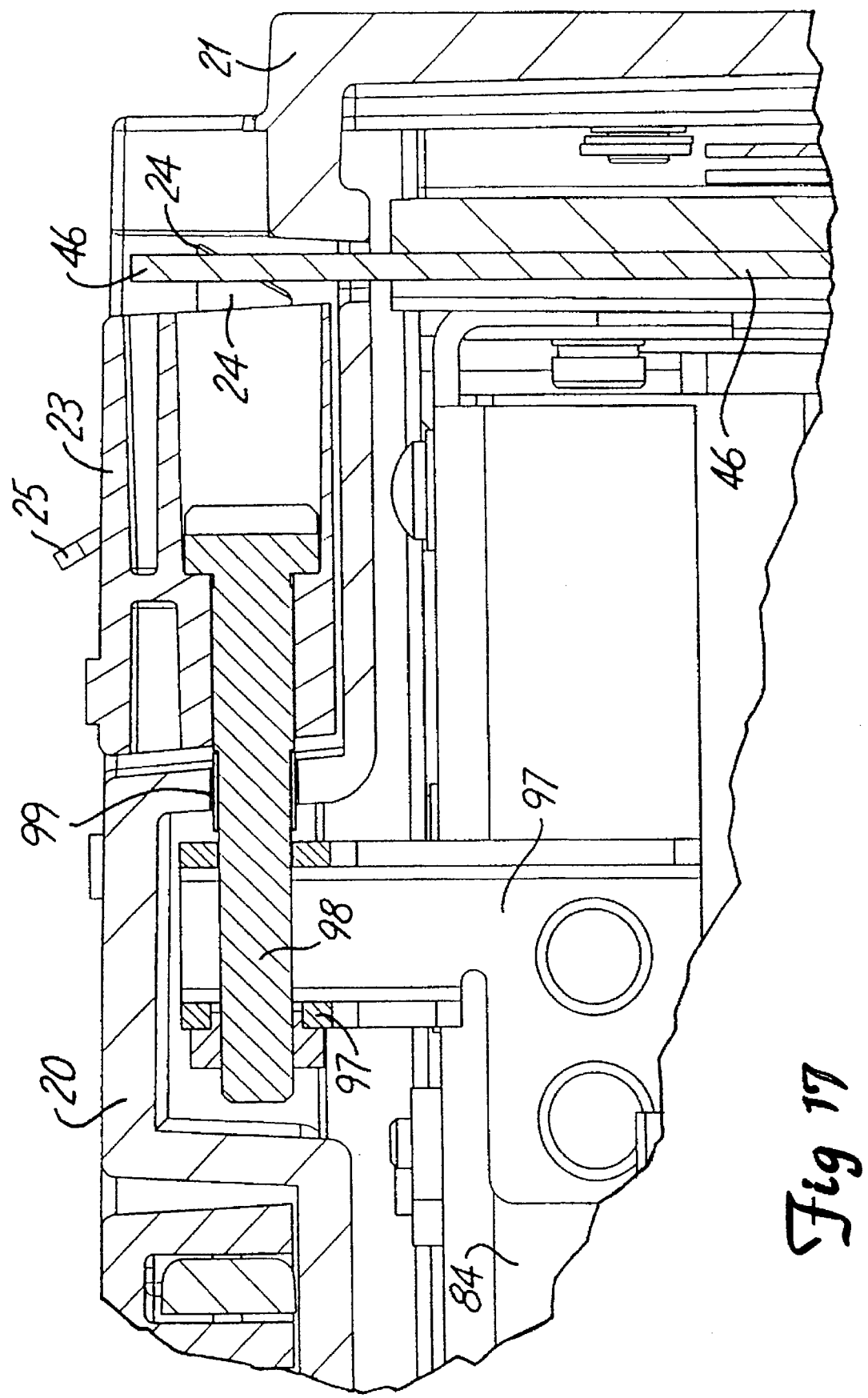
FIG. 17 is a cross-sectional view of FIG. 16, taken along lines 17—17 thereof.

In order to achieve a significant reduction in the height of the projector as it folds down, however, with the specific light path of the preferred embodiment depicted in the drawings it is necessary that the LCD panel fold from its generally vertical, operative position to a generally horizontal stored position. To achieve this, the lower portion of the LCD panel 84 is secured to the upwardly extending flanges 31 of the bottom panel 30 by suitable pivot pins 96 (see FIGS. 15 and 16). The upper portion of the LCD panel 84 is secured to a bracket 97 carrying a pin 98 which in turn rides in a longitudinal slot 99 in the top panel 20 of the projector housing (see FIGS. 15–17). As the sliding pin 98 moves along the length of the slot 99 from the position shown in FIG. 15 (open, operative position) to the position shown in FIGS. 16 and 17 (closed, folded position), the LCD panel 84 pivots about the lower pivot pin 96, and the entire projector housing folds from the parallelogram configuration depicted in FIG. 15 to the generally flat configuration of FIG. 16.

Figure 15:
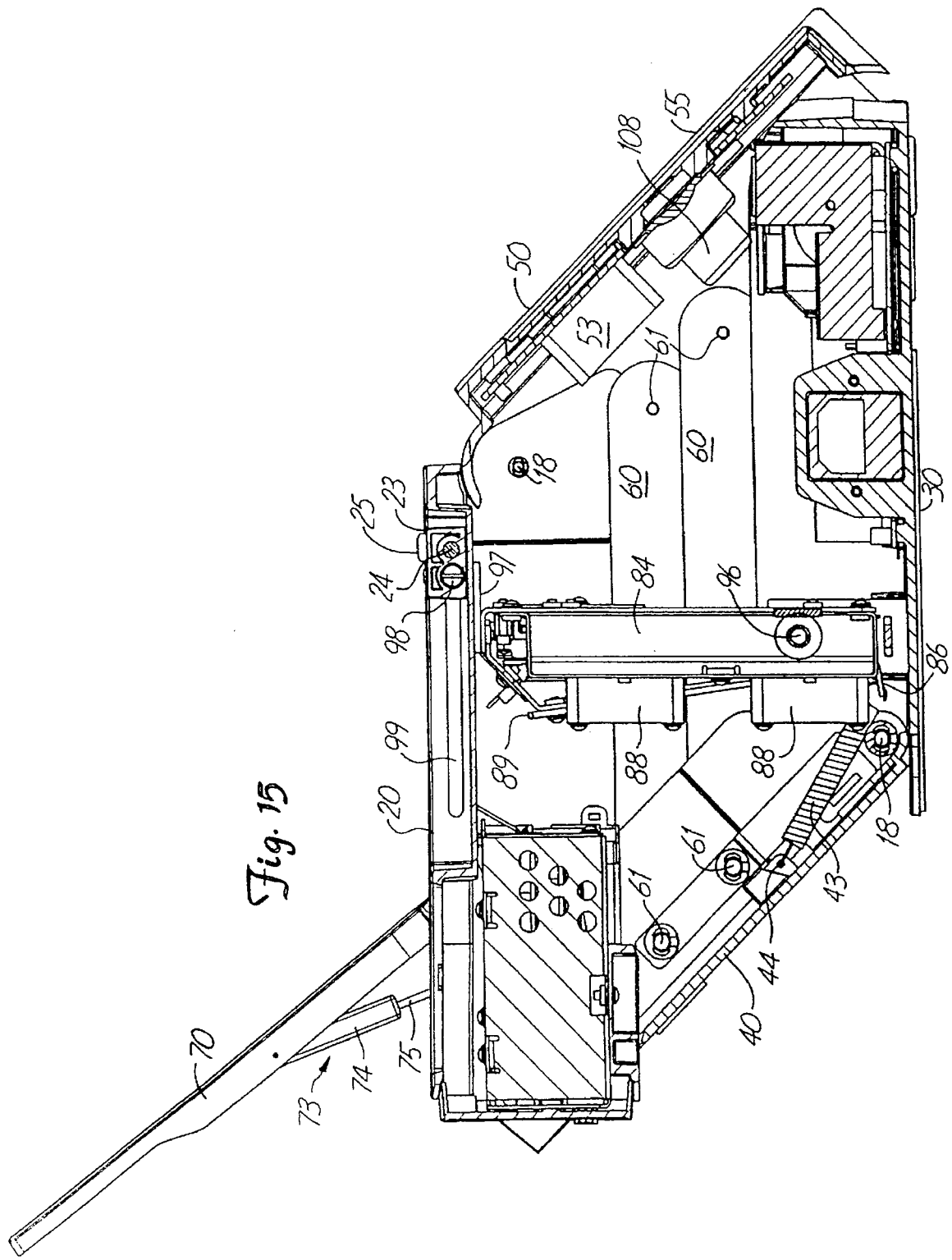
FIG. 15 is a cross-sectional view of the right side of the projector, in its unfolded position, taken just inside the right side of the projector housing and illustrating the function of the latch mechanism for folding and unfolding the projector.

To facilitate manipulation of the projector to and from its closed and open positions, an actuator handle 23 is attached to the sliding pin 98, and an extension spring 43 is connected from a tab 44 secured to the bottom panel 40 to a tab 86 extending from the bottom portion of the LCD panel 84. The geometry of the spring connections preferably is selected so that the projector pops up relatively easily as the actuator handle 23 moved from its forward position (where the projector is folded down) to its rearward position (where the projector is open and operative). Also, the force of the spring in combination with the mechanical geometry depicted in FIGS. 15 and 16 alleviate the need for any lock or latching mechanism to hold the projector in its open position—as can be seen in FIG. 15, in the open position the sliding pin 98 is located slightly rearward of the lower pivot pin 96, thus placing the LCD panel 84 and its associated mechanical components in a slightly over-center position (even though the optical components of the LCD panel itself are oriented vertically). Downward pressure exerted on the top panel will not cause the projector to fold; the projector is held in its open position by the support of the vertical LCD panel 84, which in turn is retained in its vertical position by the spring 43. When it is desired to fold the projector, however, forward movement of the actuator handle 23 easily overcomes the spring, and moves the LCD panel out of its over-center position and toward the folded position. As the unit is moved toward the folded position, the spring 43 also tends to prevent the housing from simply falling to its folded position, permitting the unit to fold with just gentle pressure.

Figure 18:
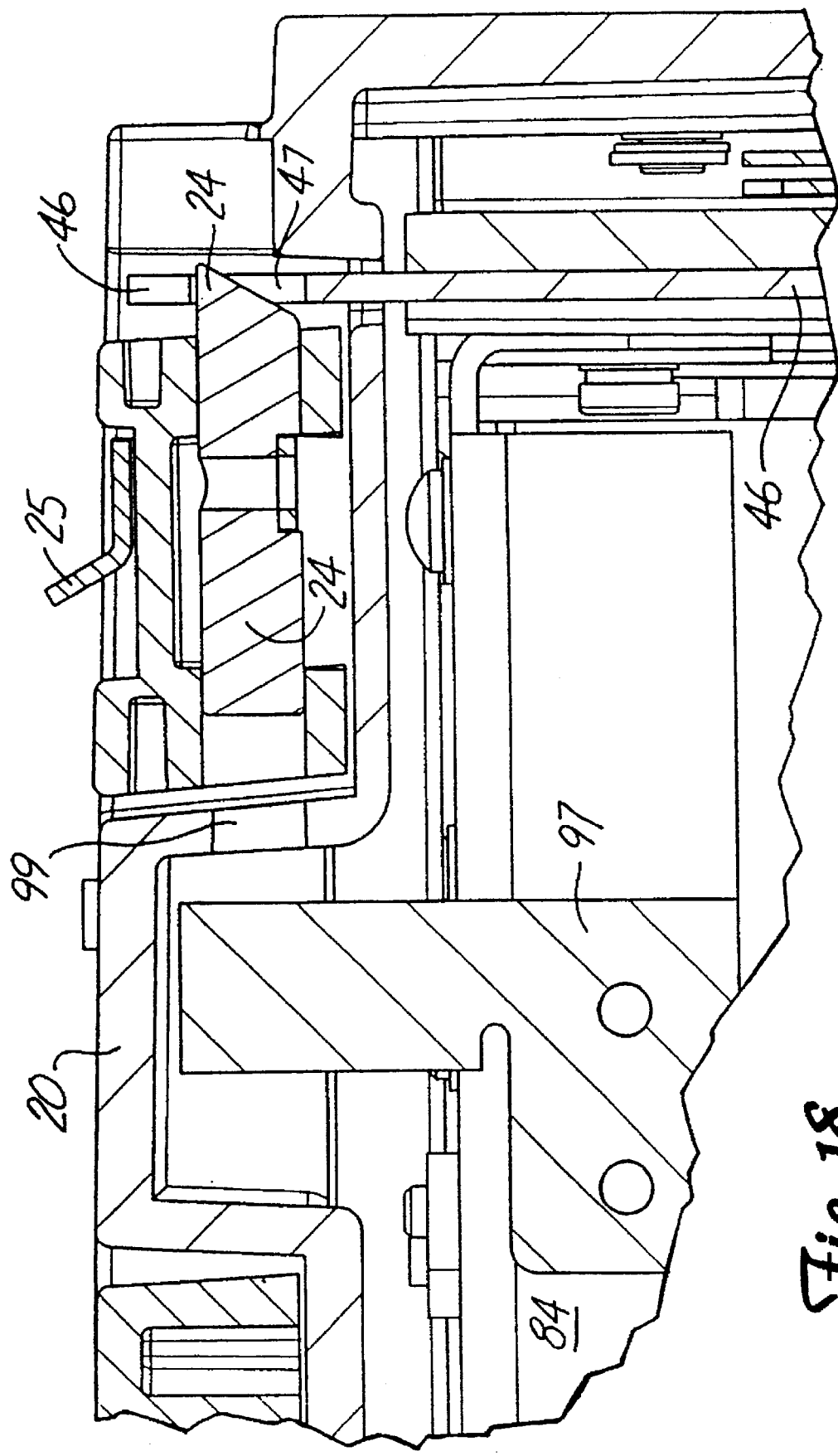
FIG. 18 is a cross-sectional view of FIG. 16, taken along lines 18—18 thereof.

Preferably a locking mechanism is provided to retain the projector in its folded position. Though any of a variety of suitable mechanisms could be employed, in the preferred embodiment depicted in the drawings a locking mechanism is built into the actuator handle 23. The lock is comprised of a locking pin 24 carried by the actuator handle 23 and a locking flange 46 mounted to the front panel 40 (see FIGS. 13 and 18). Preferably the locking pin 24 includes a beveled face; as the projector is folded from its open position to its closed position, the locking flange projects upwardly through a slot in the top panel 20, and engages the beveled face of the locking pin 24. Preferably the locking pin is spring-biased so that it will retract under pressure from the locking flange until a slot 47 in the locking flange 46 comes into alignment with the locking pin 24, at which point the projector is fully folded and the locking pin 24 snaps back (under spring pressure), engaging the locking pin 24 in the slot 47 of the locking flange 46. When one desires to open the projector, lateral movement of external tab 25 disengages the locking pin 24 from the locking slot 47 of the locking flange 46, permitting the actuator handle 23 to be slid from its forward, closed position, to its rearward open position, bringing the LCD panel to its operative position.

Figure 19:
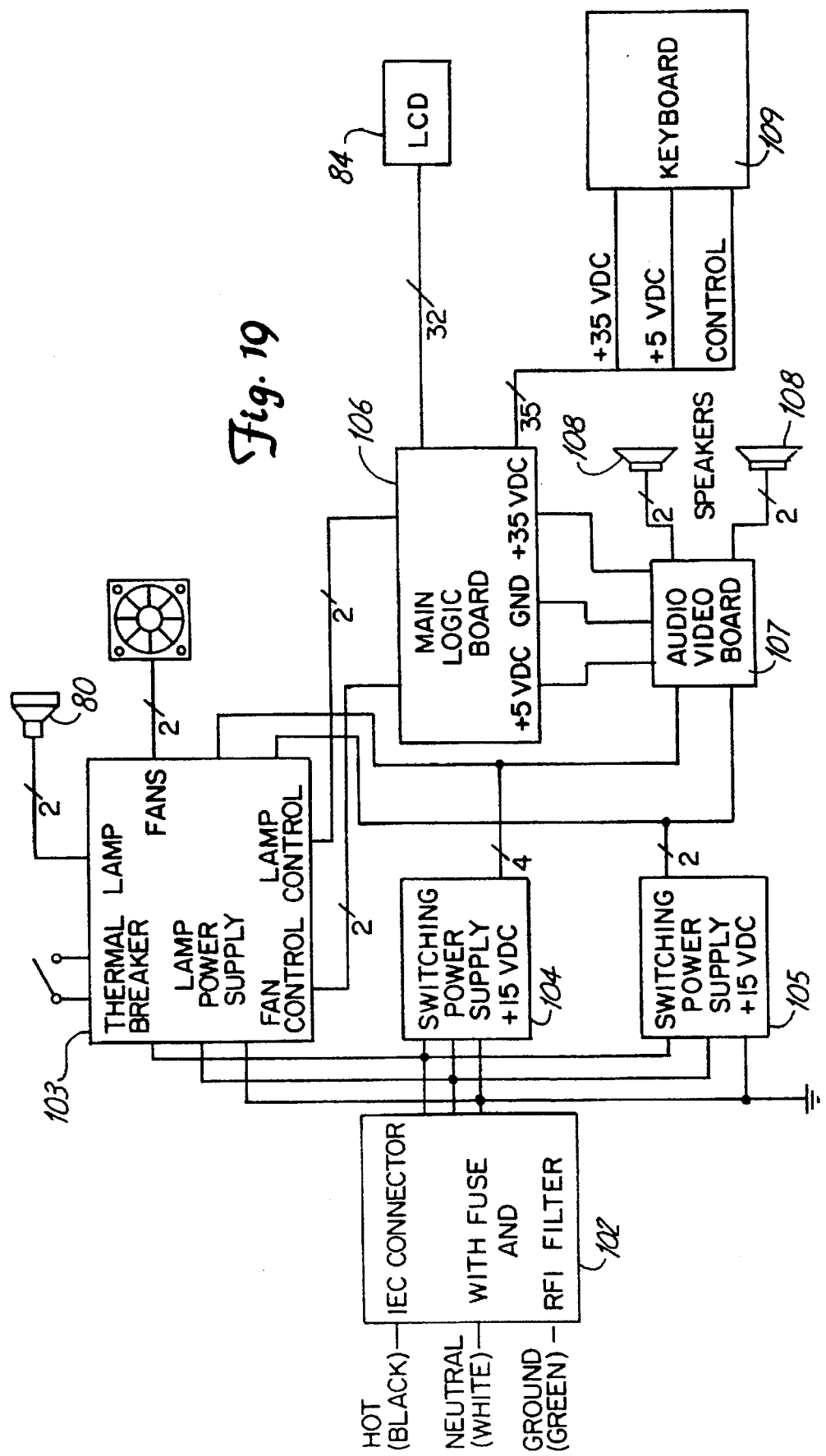
FIG. 19 is a block diagram of the electrical components of the projector of FIG. 1.

FIG. 19 depicts in block diagram form the electrical components of the projector, external connections to which are visible in physical form on the front panel 40 of the projector (see, e.g., FIG. 1). Any of a variety of suitable electrical configurations could be utilized depending on the functions and power requirements of the components utilized in the projector. In the preferred embodiment illustrated in the drawings, conventional household AC current (110 V–240 V, 50/60 Hz) is provided, through a fuse and FRI filter 102, to three separate power supplies: a lamp and fan power supply 103, and two switching power supplies 104 and 105 which provide 15 V DC power for the remaining components of the projector, including the main logic board 106 and the audio/video board 107 and associated components (including speakers 108). A conventional keyboard 109 is provided to enable the user to control the basic functions of the projector, such as brightness, contrast, volume, input source, focus, lamp on/off, etc. The external connection ports (see FIG. 1) preferably include VGA in 63, VGA out 64 (permitting a conventional computer monitor to be used simultaneously with the projector), composite video in 65, SVHS in 66, audio in 67, and audio out 68. An IR remote sensor 69 is also provided to permit the projector to be controlled by a hand-held remote control.

The lamp 80 is selected to provide the desired light output based on the desired performance characteristics of the projector. If, as is in the case of the projector shown in the drawings, a relatively high light output lamp is utilized, one or more cooling fans may be employed to remove heat from the projector. In the preferred embodiment shown in the drawings, a pair of cooling fans 53 is provided to cool the first mirror 82 carried on the back panel 50. An additional cooling fan 34 is provided to cool the space surrounding the lamp 80, and another pair of cooling fans 88 are provided to cool the LCD panel. To further assist in removing heat emitted by the lamp 80, the first mirror 82 may be a "cold" mirror which does not reflect IR radiation; an aluminum plate mounted behind the mirror 82 thus absorbs the IR radiation, and that plate 55 is cooled by the two cooling fans 53 carried by the back panel 50.

While a preferred embodiment of the present invention has been described, it should be understood that various changes, adaptations and modifications may be made therein without departing from the spirit of the invention and the scope of the claims set forth below.

What is claimed is:

1. A projector comprising:

a housing having top, bottom, front and back panels hingedly connected and being movable from a first, folded position to a second, open position generally in the shape of a parallelogram;

a light source carried within the housing;

a lens carried within the housing;

an image forming panel carried within the housing in a location optically between the light source and the lens, the panel being movable from a first, stored position to a second, operating position;

one or more mirrors for directing light emitted by the light source through the image forming panel and the lens for projection on a viewing surface.

2. The projector of claim 1 wherein the image forming panel is oriented generally horizontally in its first, stored position.

3. The projector of claim 1 wherein the image forming panel is oriented generally vertically in its second, operating position.

4. The projector of claim 1 including a mechanical linkage between the image forming panel and the housing, the linkage moving the housing from its first, folded position to its second, open position when the image forming panel is moved from its first, stored position to its second, operating position.

5. The projector of claim 1 wherein the image forming panel is mounted in a frame having upper and lower portions, the upper portion of the frame being connected by a slide mechanism to the housing top panel and the lower portion of the frame being pivotally connected to the housing bottom panel.

6. The projector of claim 5 wherein the slide mechanism comprises a pin carried by the upper portion of the image forming panel, the pin being received in a slot formed in the upper panel.

7. The projector of claim 6 wherein the pin has a longitudinal axis oriented generally horizontally.

8. The projector of claim 7 wherein the pin extends outwardly through the slot, and includes a manually manipulatable actuator handle for moving the image forming panel from its first, stored position to its second, operating position, and, hence, the housing from its first, folded position to its second, open position.

9. The projector of claim 8 further comprising a locking mechanism associated with the actuator handle for locking the actuator handle in a position corresponding to the housing folded position.

10. The projector of claim 1 further comprising spring means for urging the housing toward its second, open position.

11. The projector of claim 10 wherein the image forming panel is mounted in a frame having a lower portion, the spring means comprising a spring having a first end connected to the lower portion of the image forming panel and a second end connected to the front panel of the housing.

12. The projector of claim 1 including first and second mirrors for directing light emitted by the light source through the image forming panel and the lens, the first mirror being carried by the housing back panel and the second mirror being carried by the housing front panel.

13. The projector of claim 12 further comprising a third mirror carried by the housing top panel at a position above the lens and generally in the path of light focused by the lens, the third mirror being movable from a first, closed position, where the mirror is oriented generally parallel to the housing top panel, to a second, operative position where the mirror is oriented at an acute angle extending upwardly from the housing top panel to reflect the focused light toward the viewing surface.

14. The projector of claim 12 wherein the first and second mirrors are mounted to their respective housing panels so that when the housing is in its second, open position with the image forming panel in its generally vertical position, the first and second mirrors are oriented at about a 45° angle to the image forming panel.

15. The projector of claim 1 wherein the top, bottom, front and back panels are all oriented generally horizontally when the housing is in its first, folded position.

16. The projector of claim 1 wherein the top and bottom panels are oriented generally horizontally when the housing is in its second, open position.

17. The projector of claim 1 wherein the front and back panels are oriented at about a 45° angle to the top and bottom panels when the housing is in its second, open position.

18. The projector of claim 1 wherein the image forming panel is an LCD panel.

19. The projector of claim 1 further comprising one or more slats, each slat being pivotally attached at its first end to the front panel of the housing and at its second end to the back panel, the slats forming side panels of the projector when the housing is in its open position.

20. The projector of claim 1 wherein the top panel includes left and right sides, and left and right flanges extending downwardly from the left and right sides, respectively.

21. The projector of claim 20 wherein the bottom panel includes left and right sides, and left and right flanges extending upwardly from the left and right sides, respectively, the upwardly extending flanges nesting within the downwardly extending flanges when the housing is in its first, folded position.

22. The projector of claim 21 further comprising one or more slats, each slat being pivotally attached at its first end to the front panel of the housing and at its second end to the back panel, the slats forming side panels of the projector when the housing is in its open position, the slats nesting within the downwardly extending flanges when the housing is in its first, folded position.

23. The projector of claim 1 further comprising one or more audio speakers carried by the back panel.

24. The projector of claim 1 wherein the first mirror is carried by the housing back panel, the back panel also carrying a pair of audio speakers, one of the speakers being disposed to the left of the mirror and the other speaker being disposed to the right of the mirror.

25. The projector of claim 1 further comprising a projection mirror carried by the housing top panel at a position above the lens and generally in the path of light focused by the lens, the projection mirror being movable from a first, closed position, where the mirror is oriented generally parallel to the housing top panel, to a second, operative position where the mirror is oriented at an acute angle extending upwardly from the housing top panel to reflect the focused light toward the viewing surface.

26. The projector of claim 25 wherein the projection mirror, in its operative position, includes an upper, forward edge and a lower, rear edge, the mirror being rotatably mounted to the top panel of the housing so that it may be rotated from its operative position to its stored position where its upper, forward edge is located rearwardly of the lower, rear edge.

27. A projector comprising:

a housing having top, bottom, front and back panels hingedly connected and being movable from a first, folded position in which all such panels are generally parallel to one another, to a second, open position generally in the shape of a parallelogram wherein the top and bottom panels are oriented generally horizontally and the front and back panels are oriented at about a 45° angle to the top and bottom panels;

a light source carried within the housing;

a lens carried within the housing;

an LCD panel carried within the housing in a location optically between the light source and the lens, the LCD panel being mounted in a frame having upper and lower portions, the upper portion of the frame being connected by a slide mechanism to the housing top panel and the lower portion of the frame being pivotally connected to the housing bottom panel, the panel being movable from a first, generally horizontal storm position to a second, generally vertical operating position;

first and second mirrors for directing light emitted by the light source through the LCD panel and the lens, the first mirror being carried by the housing back panel and the second mirror being carried by the housing front panel, the first and second mirrors being mounted to their respective housing panels so that when the housing is in its second, open position with the LCD panel in its generally vertical position, the first and second mirrors are oriented at about a 45° angle to the LCD panel; and a third mirror carried by the housing top panel at a position above the lens and generally in the path of light focused by the lens, the third mirror being movable from a first, closed position, where the mirror is oriented generally parallel to the housing top panel, to a second, operative position where the mirror is oriented at an acute angle extending upwardly from the housing top panel to reflect the focused light toward the viewing surface.

28. A projector comprising:

a housing having top, bottom, front and back panels hingedly connected and being movable from a first, folded position to a second, open position generally in the shape of a parallelogram;

a light source carried within the housing;

a lens carried within the housing;

an image panel carried within the housing in a location optically between the light source and the lens;

one or more mirrors for directing light emitted by the light source through the image panel and the lens for projection on a viewing surface.

29. A projector for projecting an optical image on a viewing surface, comprising:

a housing;

a light source carried within the housing, the light source being mounted to direct a light beam generally upwardly within the housing;

a first mirror carried within the housing and above the light source, the first mirror being oriented at a generally 45° angle to reflect the light beam along a generally horizontal light path;

an image forming panel carried within the housing in a generally vertical orientation located in the generally horizontal light path, the image forming panel optically modifying the light beam and transmitting therethrough an optically modified light beam;

a second mirror carried within the housing on an opposite side of the image forming panel from the first mirror and in alignment with the generally horizontal light path, the second mirror being oriented at a generally 45° angle to reflect the optically modified light beam along a generally vertical light path;

a lens carried by the housing at a position above the second mirror, the lens optically focusing the optically modified light beam and transmitting therethrough an optically focused light beam;

a third mirror carried by the housing at a position above the lens and in the generally vertical light path, the third mirror being oriented at an acute angle to the direction of the generally vertical light path to reflect the optically focused light beam toward the viewing surface.

30. The projector of claim 29 wherein the housing is foldable to a configuration in which the first mirror, the image forming panel, the second mirror and the third mirror are all substantially parallel to one another.

31. The projector of claim 29 wherein the housing is foldable to a configuration in which the first mirror, the image forming panel and the second are all substantially parallel to one another.

32. The projector of claim 29 wherein the housing is foldable to a configuration in which the first mirror and the image forming panel are substantially parallel to one another.

33. The projector of claim 29 wherein the housing is foldable to a configuration in which the second mirror and the image forming panel are substantially parallel to one another.

34. The projector of claim 29 wherein the housing is foldable to a configuration in which the third mirror and the image forming panel are substantially parallel to one another.

* * * * *